Dec. 1, 1925.

H. M. PIERCE 1,564,019

MILK BOTTLE COVER

Filed Aug. 21, 1924

INVENTOR.
Henry M. Pierce,
BY
Geo. P. Kimmel.
ATTORNEY.

Patented Dec. 1, 1925.

1,564,019

UNITED STATES PATENT OFFICE.

HENRY M. PIERCE, OF CHIPPEWA FALLS, WISCONSIN.

MILK-BOTTLE COVER.

Application filed August 21, 1924. Serial No. 733,389.

*To all whom it may concern:*

Be it known that I, HENRY M. PIERCE, a citizen of the United States, residing at Chippewa Falls, in the county of Chippewa and State of Wisconsin, have invented certain new and useful Improvements in Milk-Bottle Covers, of which the following is a specification.

This invention relates to a milk bottle cover and is designed primarily as an improvement upon the form of milk bottle cover set forth in Letters Patent, #1,480,415 granted to me January 8, 1924, and not only possesses the objects and advantages of the device disclosed by said Letters Patent, but has for its further object to provide a milk bottle cover, in a manner as hereinafter set forth, capable of being employed with bottle necks of varying diameters, but further acting as a clamp for securely connecting the cover to the neck of the bottle, as well as permitting of the cover to be easily removed when occasion so requires.

A further object of the invention is to provide, in a manner as hereinafter set forth, a milk bottle cover with means not only acting as a hinge for the sections of the cover, but further acting as a clamp for frictionally securing the cover to the neck of the bottle and further for maintaining the sections of the cover in abutting position.

A further object of the invention is to provide, in a manner as hereinafter set forth, an attachment for milk bottles for not only protecting the milk from contamination but further providing means to receive and contain cash or tickets in payment for the milk, and further acting as a protector for the ordinary closure disk or cap for the bottle.

Further objects of the invention are to provide, in a manner as hereinafter set forth, a milk bottle cover, which is simple in its construction and arrangement, strong, durable, thoroughly efficient and convenient in its use, readily installed upon the neck of the bottle, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
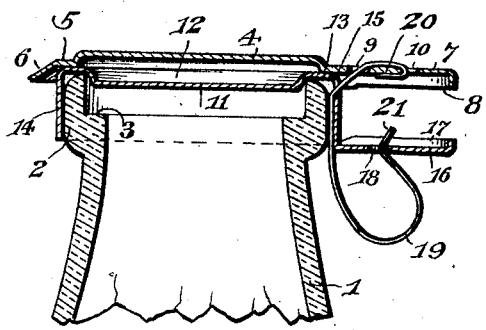
Figure 1 is a fragmentary view, in vertical section, of the upper portion of a milk bottle, showing the adaptation therewith of a cover in accordance with this invention. The cover is illustrated in cross section.

Referring to the drawings in detail, 1 denotes the body portion of a milk bottle, 2 the neck thereof, and 3 an annular shoulder formed on the inner face of the neck and upon which is positioned the ordinary closure disk or cap now employed in connection with milk bottles. The cap is not shown.

A milk bottle cover, in accordance with this invention, comprises an upper section or closure member, a body portion or lower section, and a resilient element connecting the two sections together and constituting a hinge therefor, as well as a means for normally maintaining the upper section in position to close the lower section, and further acting as a means for frictionally securing the cover to the neck of the bottle. The upper and lower sections can be constructed of any suitable material, preferably thin metal, and each of which is stamped out to provide for the desired contour of each of the sections.

The upper section or closure member comprises an inner up-set circular portion 4, a flat annular intermediate portion 5, which projects from the portion 4, a depending inclined annular flange 6, which surrounds and projects from the portion 5, and a laterally extending handle 7 provided throughout with a depending flange 8, which is integral with the flange 6. The handle 7 is integral with and projects from the intermediate portion 5. The handle 7 is formed with a pair of spaced transversely extending rectangular slots 9, 10.

The body portion or lower section is provided with an inner depressed circular portion 11, which opposes the up-set portion 4 of the upper section and provides a compartment 12 for the reception of coins or tickets. Surrounding the inner portion 11 is a flat annular intermediate portion 13 which terminates in a depending continuous annular rim or collar 14, adapted to surround the neck 2 when the cover is mounted in position. At the point of joinder of the rim 14 with the portion 13 a slot 15 is formed. Projecting laterally from the lower part of the rim 14, is a handle 16, which opposes the handle 10 and is formed with a vertically disposed flange 17. The handle 16 is furthermore provided with a transversely extending rectangular slot 18.

Figure 3:
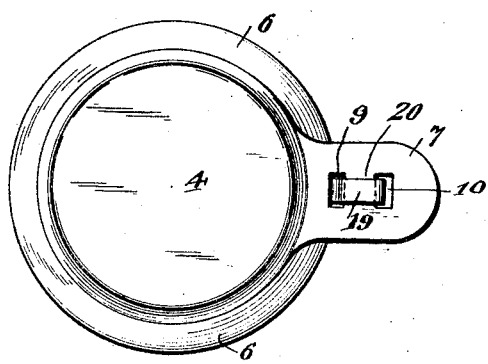
Figure 3 is a top plan view.

The upper section constitutes a closure for the depressed portion 11 of the lower section and when the two sections are in abutting position, the intermediate portion 5 of the upper section rests upon and extends from the intermediate portion 13 of the lower section. The flange 6 extends from one side to the other side of the flange 8 of the handle 7. See Figure 3. The handles 7 and 16 are what may be termed finger grips to facilitate the positioning of the cover and further to provide for the convenient opening of the sections relative to each other, when occasion so requires, so that coins or tickets can be positioned or removed in or from the cover.

Figure 2:
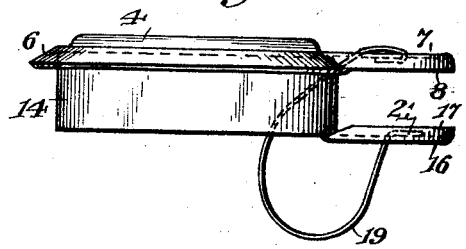
Figure 2 is a side elevation of the cover.
Figure 4:
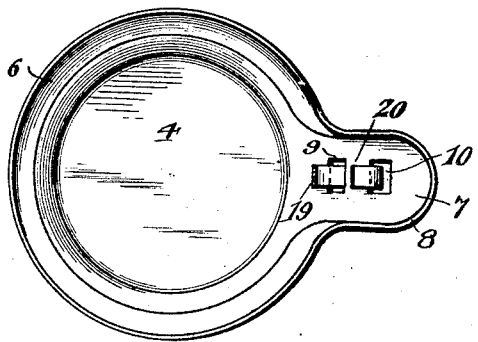
Figure 4 is an inverted plan of the upper section of the cover.
Figure 5:
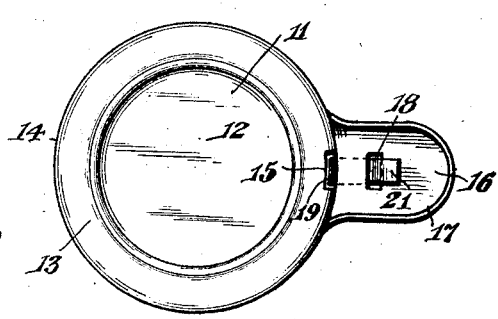
Figure 5 is a top plan view of the lower section of the cover.

The resilient element which provides means for frictionally securing the cover to the bottle, as well as for normally maintaining the sections of the cover in abutting position, and further acting as a hinge, consists of a substantially elongated flat spring 19, which is extended through the slots 9 and 10 and bent against the inner face of the hinge 7, as at 20, for the purpose of securing one end of the spring to the handle. The spring extends through the slot 15 and against the inner face of the rim 14 and is of a length to depend below the handle 16. The other end of the spring 19 is extended through the slot 18 and is angularly disposed, as at 21, to set up a connection with the handle 16 and further so that the spring will assume the position shown in Figure 2 when the cover is removed from the bottle and assume the position shown in Figure 1 when the cover is attached to the bottle. The interposition of the spring between the rim 14 and the bottle neck acts as a frictional lock and overcomes any looseness between the cover and bottle neck when the cover is mounted in position. The intermediate portion 13 acts as a fulcrum for the upper section of the cover when the latter is mounted in position on the bottle neck and when it is desired to position or remove coins or tickets in or from the compartment 12. The flanging of the handles 7 and 16 reinforces the same. When the cover is mounted on the bottle or removed therefrom, the handles 7 and 16 are arranged in parallelism.

It is thought that the many advantages of a bottle cover, in accordance with this invention, and for the purpose set forth, can be readily understood, but although the preferred embodiment of the invention is as illustrated and described, yet changes in the details of construction can be had which will fall within the scope of the invention as claimed.

What I claim is:—

1. A milk bottle cover comprising a body portion having a depressed inner part, a depending rim spaced from said depressed part and a handle member extended laterally from the lower edge of said rim, a closure member having an up-set inner part opposing the depressed part of the body portion, said closure member further including an inclined flange spaced from said up-set part and a laterally extending handle projecting from said flange and opposing the handle of the body portion, said rim and handles being slotted, and a resilient element positioned against the inner face of and further extending through said rim, said element having its upper end connected to the slotted handle of the closure member and its lower end connected to the slotted handle of the body portion and providing means for securing said closure against said body portion and the latter to the bottle.

2. A milk bottle cover consisting of a body portion and a closure member arranged in superposed relation, said member and body portion having coacting means to provide a compartment normally closed by said member, and a resilient element connected to said member and body portion and further depending from the latter and constituting means for hinging said member and body portion together and for frictionally securing said body portion in position on a bottle, said element having a portion thereof positioned against the inner face of said body portion to frictionally engage the bottle.

3. A milk bottle cover consisting of a body portion and a closure member arranged in superposed relation, said member and body portion having coacting means to provide a compartment normally closed by said member, and a resilient element connected to said member and body portion and further depending from the latter and constituting means for hinging said member and body portion together and for frictionally securing said body portion in position on a bottle, said body portion including a rim to surround the neck of the bottle through which extends said element and the latter having a portion of its length positioned against the inner face of the rim for frictionally engaging the bottle.

4. A milk bottle cover consisting of a body portion and a closure member arranged in superposed relation, said member and body portion having coacting means to provide a compartment normally closed by said member, and a resilient element connected to said member and body portion and further depending from the latter and constituting means for hinging said member and body portion together and for frictionally securing said body portion in position on a bottle, said body portion including a rim to surround the neck of the bottle through which extends said element and the latter having a portion of its length positioned against the inner face of the rim to frictionally engage the bottle, said body portion and said member each provided with a laterally extending handle, said handles opposing each other and having said element connected thereto.

5. A cover for milk bottles comprising a body portion including a rim and a depressed part and a handle extending laterally from the rim, a closure member including an up-set part and a laterally extending handle opposing the handle of the body portion, said up-set and depressed parts providing a compartment normally closed by said member, and a resilient element having one end connected to the handle of said member and its other end connected to the handle of said body portion, said element extended through and further having a portion thereof positioned against the inner face of the rim for engagement with the neck of the bottle to constitute a frictional lock for the cover when mounted on the bottle and further constituting means for normally maintaining said member in closed position.

6. A milk bottle cover consisting of a body portion and a closure member arranged in superposed relation, said body portion adapted to be mounted on a bottle neck, said member and body portion having coacting means to provide a compartment normally closed by said member, and a resilient locking element connected to said member and body portion for hinging them together and further engaging the bottle neck for frictionally securing said body portion in position thereon.

7. A milk bottle cover consisting of a body portion and a closure member arranged in superposed relation, said body portion adapted to be mounted on a bottle neck, said member and body portion each having an off-set part thereof coacting to provide a compartment normally closed by said member, and a resilient element connected to said member and body portion for hinging them together and further engaging the bottle neck for frictionally securing said body portion in position thereon.

8. A milk bottle cover consisting of an inverted cup-shaped body portion and a closure member arranged in superposed relation, said body portion adapted to be mounted on a bottle neck, said member and body portion each having a part thereof off-set and coacting one with the other to provide a compartment normally closed by said member, a handle extended from said member, a handle extended from the lower end of said body portion and spaced from the handle of the member, and a resilient locking element having one end secured to the handle of said member and its other end extended through the body portion and through the handle of the latter and providing a hinged connection between said member and body portion, said element further having a portion thereof engaging the bottle neck for frictionally securing the body portion in position thereon.

In testimony whereof, I affix my signature hereto.

HENRY M. PIERCE.